United States Patent
Chan et al.

(10) Patent No.: US 11,240,590 B2
(45) Date of Patent: Feb. 1, 2022

(54) BABY MONITOR SYSTEM WITH NOISE FILTERING

(71) Applicant: Kelvin Ka Fai Chan, Kowloon (HK)

(72) Inventors: Kelvin Ka Fai Chan, Kowloon (HK); Hon Hung Leung, New Territories (HK); Hon Kuen Chan, New Territories (HK); Zhi Qiang Gan, Kowloon (HK); Tse Yim Lau, Kowloon (HK)

(73) Assignee: MERIT ZONE LIMITED, New Territories (HK)

( * ) Notice: Subject to any disclaimer, the term of this patent is extended or adjusted under 35 U.S.C. 154(b) by 0 days.

(21) Appl. No.: 16/910,096

(22) Filed: Jun. 24, 2020

(65) Prior Publication Data

US 2021/0037311 A1    Feb. 4, 2021

Related U.S. Application Data

(60) Provisional application No. 62/880,764, filed on Jul. 31, 2019.

(51) Int. Cl.
*H04R 1/22*    (2006.01)
*G08B 21/02*    (2006.01)

(52) U.S. Cl.
CPC ........... *H04R 1/22* (2013.01); *G08B 21/0219* (2013.01)

(58) Field of Classification Search
CPC .. H04R 1/22; G08B 21/0202; G08B 21/0219; G10L 21/0208; G10L 21/0232
See application file for complete search history.

(56) References Cited

U.S. PATENT DOCUMENTS

| | | | |
|---|---|---|---|
| 9,191,744 B2 | 11/2015 | Anderson | |
| 9,542,924 B2 | 1/2017 | Kuo | |
| 2006/0273914 A1* | 12/2006 | Carreras | G10L 21/0208 340/573.1 |
| 2012/0299732 A1 | 11/2012 | Vogel | |
| 2015/0172816 A1* | 6/2015 | Ivanov | H04R 1/08 381/99 |
| 2015/0208165 A1* | 7/2015 | Volk | H04R 3/005 381/111 |
| 2016/0174728 A1 | 6/2016 | Karp | |
| 2020/0364583 A1* | 11/2020 | Pedersen | G06N 5/02 |

* cited by examiner

*Primary Examiner* — Jason R Kurr
(74) *Attorney, Agent, or Firm* — JMB Davis Ben-David

(57) ABSTRACT

A baby monitor system with noise filtering comprises a capture device and a display device, the capture device comprises a detection module, the display device comprises a DSP processor with ENC module and filters; the detection module detects target signals from baby and environmental noise signals to form audio streaming data, and transmits the audio streaming data to the display device in encrypted format; the display device converts the audio streaming data to analog signals and passes the analog signals to input of ENC module of the DSP processor; the ENC module identifies the noise signals and target signals from the analog signals, and activates the filters to filter the noise signals according to frequency bands of noise for attenuating noise sound and to pass the target signals with signal amplification for improving target sound.

5 Claims, 3 Drawing Sheets

BABY MONITOR SYSTEM WITH NOISE FILTERING

CROSS REFERENCE TO RELATED APPLICATIONS

This application claims priority of Provisional Application No. 62/880,764, filed on Jul. 31, 2019.

FIELD OF THE INVENTION

The present invention relates to the field of baby monitor. Specifically, the present invention relates to a baby monitor system with noise filtering for cancellation/reduction of the environmental noise.

BACKGROUND OF THE INVENTION

Constant monitoring of babies is a concern of every parent, thus baby monitors are popular. Baby monitors allow remote monitoring of babies. In general, there are a camera unit (TX) which is placed nearby the target object (baby) for capturing the image/sound and a display unit (RX) for monitoring purpose by parents or guardians. The camera unit and the display unit are connected wirelessly and needed to be paired before normal operation. After the pairing process, the camera unit detects sound and movement made by the baby, and transmits encrypted video and audio data to the display unit for monitoring by the parents or guardians.

However, the existence of environmental noise inevitably downgrades the acoustic quality of the baby monitor. Although noise cancellation technology has been applied on some audio products such as headphones, earphones, etc., the technology is not applied to the product category of baby monitor intentionally mainly because of the circuitry design of the current baby monitor.

SUMMARY OF THE INVENTION

According to the present invention, the baby monitor system integrates noise filtering function to realize cancellation/reduction of the environmental noise, so as to provide high quality audio performance and improve the user experience.

The present invention provides a baby monitor system with noise filtering comprising a capture device and a display device, the capture device comprises a detection module, the display device comprises a Digital Signal Processing (DSP) processor with Environmental Noise Cancellation (ENC) module and filters; the detection module detects target signals from baby and environmental noise signals to form audio streaming data, and transmits the audio streaming data to the display device in encrypted format; the display device converts the audio streaming data to analog signals and passes the analog signals to input of ENC module of the DSP processor; the ENC module identifies the noise signals and target signals from the analog signals, and activates the filters to filter the noise signals according to frequency bands of noise for attenuating noise sound and to pass the target signals with signal amplification for improving target sound.

In one embodiment, the environmental noise signals include more than one noise and different noises are according to different frequency bands, and the filters are used to filter the noises in identified frequency bands.

In one embodiment, the DSP processor includes Parametric EQ for adjusting the frequency response with an equalizer to filter the frequency bands of noise and amplify the frequency bands of target sound.

In one embodiment, the ENC module includes two microphones, the two microphones are Omni-directional and electrical characteristics of the two microphones match.

In one embodiment, the electrical characteristics at least include directivity, S/N ratio, sensitivity and distortion.

In one embodiment, DC-blocking capacitors, decoupling capacitors, and microphone bias on both paths of the two microphones are the same.

In one embodiment, the capture device includes a single microphone, output of the single microphone feeds into input of the two microphones of the ENC module.

In one embodiment, the display device includes a microcontroller (MCU); wherein the audio streaming data is transmitted from the output of the single microphone and feed into two input ports of the two microphones of the ENC module through the MCU.

In one embodiment, the display device has a user interface menu including the option of turning on or off noise reduction function; wherein the MCU sends control signals to the ENC module to activate or deactivate the noise reduction function.

In one embodiment, voltage level of the control pin to ENC module is changed according to the control signals, when voltage level of the control pin to ENC module is set to ground, the ENC module is activated, when voltage level of the control pin to ENC module is set to high, the ENC module is deactivated.

The present invention provides another baby monitor system with noise filtering comprising a capture device and a display device, the capture device comprises a detection module, the display device comprises a passive resistor-capacitor (RC) filter; the detection module detects target signals from baby and environmental noise signals and transmits to the display device; the display device passes the target signals and noise signals to the RC filter; the RC filter has an active high pass filter to filter the noise signals according to default low frequencies for attenuating noise sound and to pass the target signals with signal amplification for improving target sound.

In one embodiment, the RC filter adopts N-order active high pass filter formed by cascading at least one first-order active high pass filter and/or at least one second-order active high pass filter.

The present invention uses RC filter, DSP algorithms or DSP processor with ENC module into the baby monitor system to filter the noise signals, so as to attenuate noise signals and pass the target signals with signal amplification, thus, the sound from baby can be detected and listened by the user more clearly with high quality audio performance.

BRIEF DESCRIPTION OF THE DRAWINGS

Embodiments of the present invention are described below by way of example with reference to the accompanying drawings in which.

DETAILED DESCRIPTION OF THE INVENTION

The technical solutions in the embodiments of the present invention are clearly and completely described in the following with reference to the accompanying drawings in the embodiments of the present invention. It is obvious that the described embodiments are only parts of the embodiments of the present invention, and not all of the embodiments. Based on the embodiments of the present invention, all other embodiments obtained by a person of ordinary skill in the art without creative work should fall within the protection scope of the present invention.

In the present invention, the baby monitor system includes a capture device which is placed nearby the baby for capturing the image/sound and a display device for monitoring purpose by the user.

In one embodiment of the present invention, the capture device has a detection module and the display device has a passive resistor-capacitor (RC) filter. The detection module detects target signals from baby as well as environmental noise signals. The RC filter is integrated into the circuitry design of the baby monitor system, wherein the RC filter includes an active high pass filter circuitry. The advantage of the RC filter is that the material cost of the RC filter is relatively low. For those skilled people in the art, the noise from environment mainly consists of low frequency audio signals. The RC filter can filter the noise signals according to the low frequencies from surrounding environment, e.g. the low frequency is below 1 KHz. This helps to attenuate low frequency noise signals (e.g., fans, white noise machines, traffic, air conditioners, etc.) and to pass high frequency target signals (e.g., baby crying etc.) with signals amplification. So the sound from baby can be detected and listened by the user more clearly with high quality audio signals.

Figure 1:
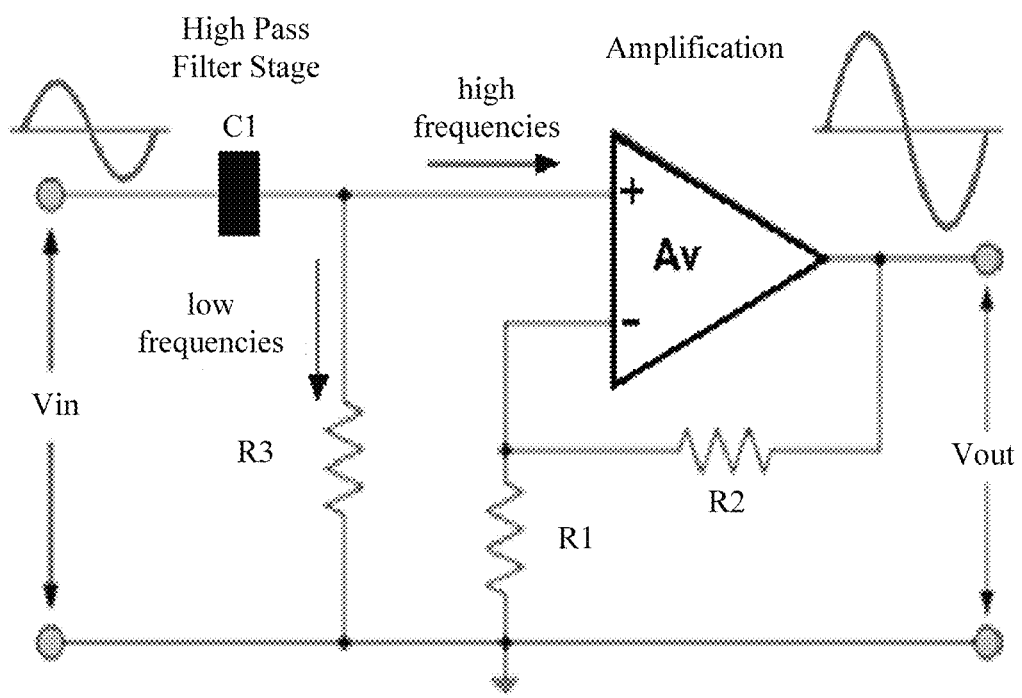
FIG. 1 is a circuit diagram of first-order active high pass filter in accordance with the disclosed embodiments.

Referring to FIG. 1, in one embodiment, the RC filter adopts first-order (single-pole) active high pass filter. The first-order active high pass filter includes a passive filter followed by a non-inverting amplifier. The frequency response of the circuit is the same as that of the passive filter, except that the amplitude of the signals is increased by the gain of the amplifier. For example, the frequency response curve of the first-order active high pass filter increases by 20 dB/decade up to the determined cut-off frequency point which is always at −3 dB below the maximum gain value.

Figure 2:
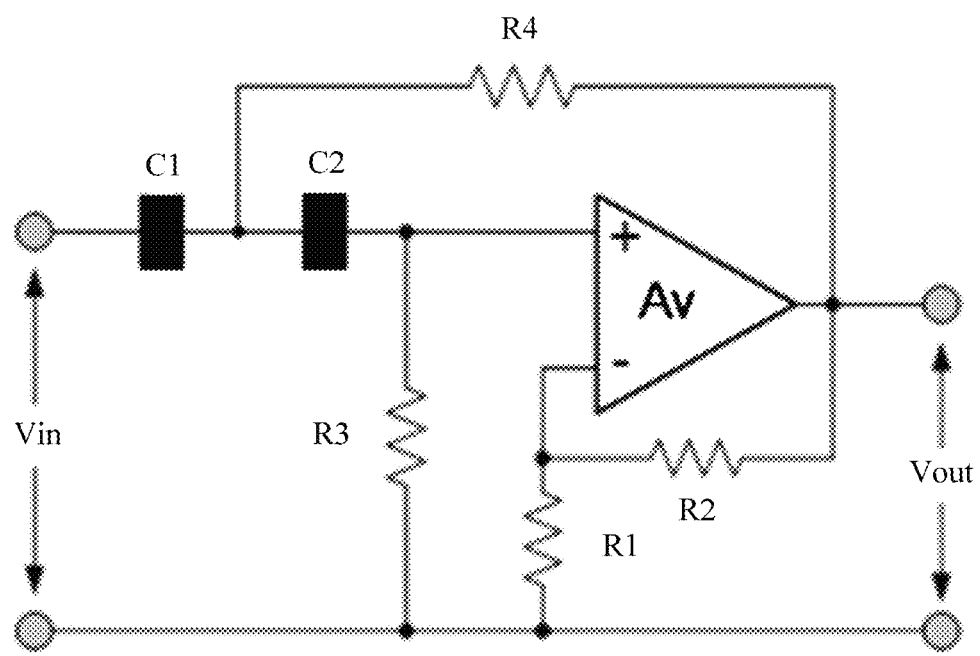
FIG. 2 is a circuit diagram of second-order active high pass filter in accordance with the disclosed embodiments.

Referring to FIG. 2, in one embodiment, the RC filter adopts second-order active high pass filter. As with the passive filter, a first-order active high pass filter can be converted into a second-order active high pass filter by using an additional RC circuit in the input path. The frequency response of the second-order active high pass filter is identical to that of the first-order active high pass filter except that the stop band roll-off is twice the first-order active high pass filter at 40 dB/decade.

In other embodiment, the RC filter adopts higher-order active high pass filters, such as third, fourth, fifth, etc. The higher-order active high pass filters are formed by cascading together first-order and/or second-order filters. For example, the third order active high pass filter is formed by cascading in series a first-order and a second-order filters, a fourth-order active high pass filter is formed by cascading two second-order filters together and so on.

For the active high pass filter, the related equations for the major parameters are described as below.

The voltage gain for the active high pass filter can be referred to below formula:

$$\text{Voltage Gain, } (Av) = \frac{Vout}{Vin} = \frac{A_F\left(\frac{f}{fc}\right)}{\sqrt{1+\left(\frac{f}{fc}\right)^2}}$$

Where:
$V_{out}$=the output voltage of the circuit;
$V_{in}$=the input voltage of the circuit;
$A_F$=the pass band gain of the filter;
f=the frequency of the input signals in Hertz, (Hz);
fc=the cut-off frequency in Hertz, (Hz).

The operation of the active high pass filter can be verified from the frequency gain equation above as:

1. At very low frequencies, $$f < fc \frac{Vout}{Vin} < A_F$$

2. At the cut-off frequency, $$f = fc \frac{Vout}{Vin} = \frac{A_F}{\sqrt{2}} = 0.707 A_F$$

3. At very high frequencies, $$f > fc \frac{Vout}{Vin} \cong A_F$$

The active high pass filter has a gain $A_F$ that increases from 0 Hz to the low frequency cut-off point, fc at 20 dB/decade (for 1st Order Active High Pass Filter) as the frequency increases. At fc the gain is 0.707*AF, and after fc all frequencies are pass band frequencies so the filter has a constant gain $A_F$ with the highest frequency being determined by the closed loop bandwidth of the amplifier.

When dealing with filter circuits, the magnitude of the pass band gain of the circuit is expressed in decibels or dB as a function of the voltage gain, and this is defined as:

$$Av(\text{dB}) = 20\log_{10}\left(\frac{Vout}{Vin}\right)$$

The Pass band Gain of the filter ($A_F$) can be found by using below formula:

$$A_F = 1 + \frac{R_2}{R_1}$$

Where:
R2 is the feedback resistor;
R1 is the corresponding input resistor.
The cut-off frequency or corner frequency (fc) can be found by using below formula:
For first-order active high pass filter $$fc = \frac{1}{2\pi RC} Hz$$

For second-order active high pass filter $$f_c = \frac{1}{2\pi \sqrt{R_3 R_4 C_1 C_2}}$$

and so on.

One embodiment of the present invention disclosed herein relate generally to the baby monitor system with noise filtering by using Digital Signals Processing (DSP) algorithms, wherein the digital high pass filter and the digital low pass filter can be implemented. A desired band pass filter is formed by cascading at least one high pass filter and at least one low pass filter. The band pass filter's characteristic can be easily designed and changed by software programming to approach the flexibility for the filter.

In one embodiment, the implementation by using Digital Signals Processing (DSP) processor is also a possible solution. The present invention includes the DSP processor with using Environmental Noise Cancellation (ENC) technology for implementation of noise cancellation/reduction feature. The DSP processor is a microprocessor chip with its architecture optimized for the operational needs of digital signals processing and is usually to measure, filter or compress continuous real-world analog signals via the execution of its digital signals processing algorithms. In the present invention, the filtering function of the DSP processor is used to achieve the noise cancellation/reduction purpose. With applying the DSP processor on the baby monitor system of the present invention, the ambient noise received in baby's room can be reduced, so that the sound from the baby can be detected and listened by the user more clearly.

Figure 3:
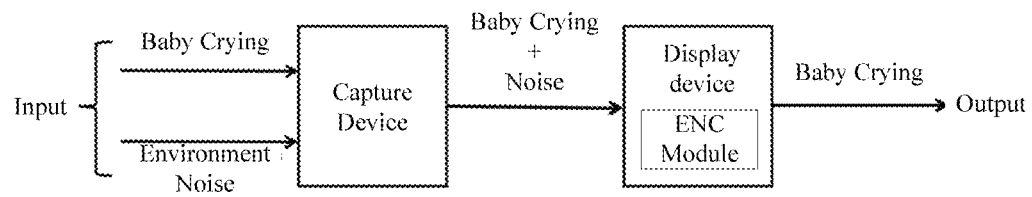
FIG. 3 is a block diagram of the baby monitor system including DSP with ENC module embedded in the display device in accordance with the disclosed embodiments.
Figure 4:
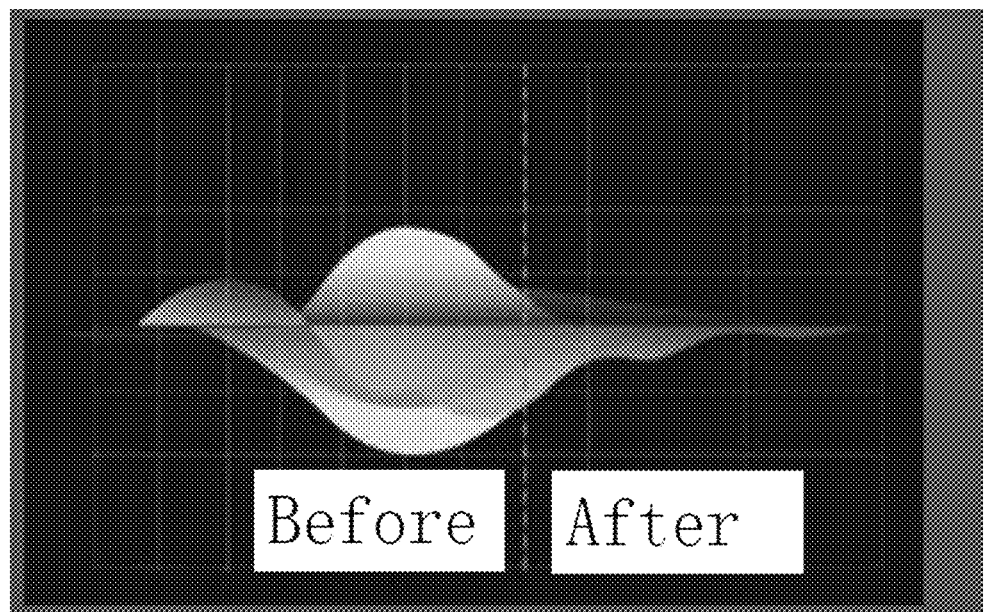
FIG. 4 is a spectrum diagram before and after noise cancellation/reduction of the baby monitor system in accordance with the disclosed embodiments.

Referring to FIG. 3 which is the block diagram of the baby monitor system including DSP processor with ENC module embedded in the display device. The capture device includes a voice detection module. The voice detection module of the capture device detects the target signals (e.g., baby crying) as well as the environmental noise signals (e.g., fans, air purifiers, air conditioners, etc.). The audio streaming data including the mixture of the target signals and noise signals is transmitted from the capture device to the display device in encrypted format. The display device converts the audio streaming data to analog signals and then passes to the input of ENC module, the ENC module identifies the frequency bands of noise. The environmental noise signals include more than one noise and different noises are according to different frequency bands. The filters are used to filter the noises in identified frequency bands. Once frequency bands of noise are detected, the ENC module activates related filter to filter the detected frequency bands for noise. The frequency bands of the target sound outside the detected frequency bands of noise can be passed. Eventually, the target signals (pure baby crying sound without noise) can be heard from the speaker's output of the display device. Therefore, the noise signals are filtered and the amplitude of noise level can be reduced. Referring to FIG. 4 which is the spectrum diagram before and after noise cancellation/reduction of the baby monitor system of the present invention.

The ENC module of the DSP processor of the present invention can support multi audio effect functions. The audio effect functions include Surround Headphone, Sound Expender, Parametric EQ, Dynamic Bass, Brilliant Audio and Smart Volume etc. In the embodiment, the Surround Headphone and Sound Expander cannot be active at the same time, while other audio effect functions can work independently. However, in other embodiment, all audio effect functions can work independently or with other settlement. It is not limited in the present invention.

Figure 5:
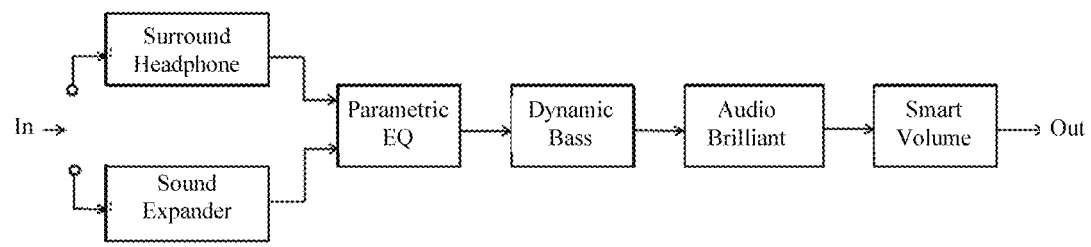
FIG. 5 is a block diagram of the audio effect functions in accordance with the disclosed embodiments.

Referring to FIG. 5 which is the block diagram of the audio effect functions.
Where:
Surround Headphone: Generate surround effect with headphone;
Sound Expander: Generate surround effect with two speakers;
Parametric EQ: Adjusting the frequency response with a 5 bands equalizer;
Dynamic Bass: Simulating bass effect with speakers (Many speakers lack of very low frequency response due to the cut off frequency limitation);
Brilliant Audio: Enhancing the high frequency components to make the audio brighter;
Smart Volume: Providing a comfortable listening experience by controlling the dynamic range of audio signals.

In the baby monitor system of the present invention, the audio effect function of Parametric EQ is applied to realize the noise cancellation/reduction. The DSP processor includes the Parametric EQ for adjusting the frequency response with equalizer to filter the frequency bands of noise while keep or amplify the frequency bands of target sound. The parametric EQ controls the audio signal's frequency content, which is divided into several bands of frequencies. The parametric EQ can be a combination of broad and narrow bandwidths to achieve the desired effect which is to remove the noise band while keep or amplify the signal band of content in the present invention.

The current ENC module uses two microphones, and the two microphones need to meet the requirements of omni-direction, low noise and low manufacturing tolerance. The electrical characteristics of the two microphones have to match, i.e. the electrical and passive components in both paths must be nearly the same. The DC-blocking capacitors, decoupling capacitors, and microphone bias of both microphone paths are same. When the conditions are met, the noise cancellation is fully effective. As an example, the following are the electrical characteristics of microphones in the capture device of the baby monitor system:

| No. | Item | Specification |
| --- | --- | --- |
| 1 | Directivity | Omni-directional |
| 2 | S/N ratio | Min 58 dB (f = 1 kHz) |
| 3 | Sensitivity | −44.5 + −2 dB (f = 1 kHz) |
| 4 | Distortion | Max 3% (f = 1 kHz, Pin = 104 dB) |

However, the current baby monitor system only has single microphone for picking up sound. In the present invention, to fulfill the requirement of two microphones of the ENC module, the output of the single microphone needs to be feed into the input of the two microphones of the ENC module. Specifically, the decoded baseband audio data is OUTR which is input to two microphone input ports of ENC module from the microcontroller (MCU) of display device. The control signals are sent from the MCU to the ENC module. Voltage level of the control pin to ENC module (ENC-SW) is changed according to the control signals. When the voltage level of the control pin to ENC module is set to ground, the ENC module is activated and it is deactivated when the voltage level is set to HIGH. In active state, the ENC module identifies the frequency bands of noise by using auto-correlation function between two microphone input signals and activates related filter to filter the detected frequency bands for noise.

Figure 6:
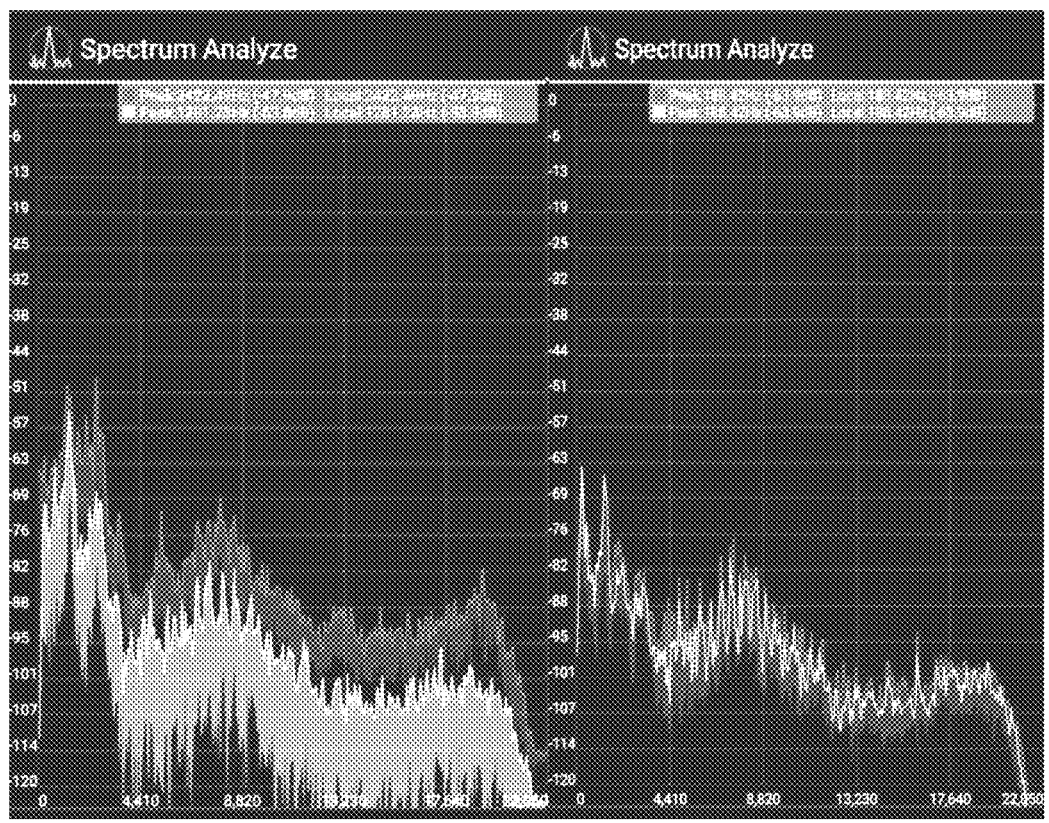
FIG. 6 is a schematic view of showing the effect to the output sound signal in accordance with the disclosed embodiments.

Mixing the original input signals with noise signals are to show the effect to the output sound signals. Referring to FIG. 6, left-hand side is the audio spectrum of the mixed input signals while right-hand side is the output signals after noise filtering by the DSP processor. The amplitude of noise signals in its frequency band (<4.4 KHz) has been diminished significantly by respective Parametric EQ band pass filter while the high frequency band (>4.4 KHz) has been kept similar to original input signals. From this FIG. 6, the peak amplitude of noise has been reduced from −47 dB to −63 dB significantly to achieve the noise cancellation/reduction effect.

Figure 7:
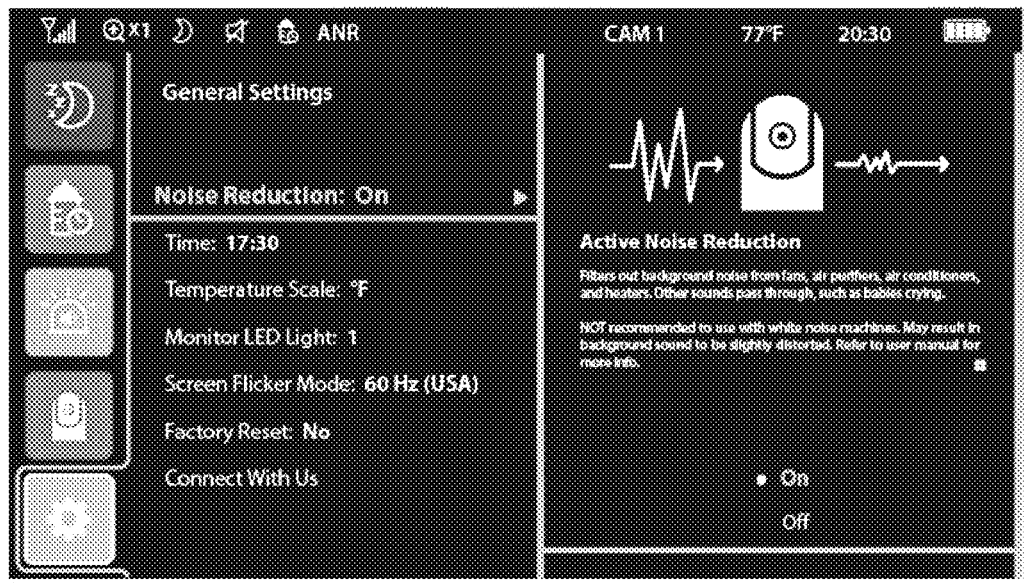
FIG. 7 is a spectrum diagram view of User Interface Menu option at the display device in accordance with the disclosed embodiments.

Referring to FIG. 7, the present invention also provides the compatible User Interface Menu option at the display device for the user to choose the option of turning on or off the noise reduction function. In the baby monitor system of the present invention, the user can use the User Interface Menu option, so that the internal microcontroller sends the control signals to ENC-SW pin of ENC module to activate the noise reduction function. Therefore, the sound from baby can be detected and listened by the user more clearly with high quality audio signals after activating the noise cancellation/reduction function and the new function is useful and attractive to the user of the baby monitor.

It is to be understood that the embodiment of the present invention which has been described is merely illustrative of one application of the principles of the invention. Numerous modifications may be made to the specific structures and functions used in that embodiment without departing from the true spirit and scope of the invention. For example, the present invention can be used for the product category of any kinds of baby monitor with wireless or non-wireless, video or audio type, in any product size etc., to achieve the purpose of noise cancellation/reduction/improvement/enhancement in order to improve the audio quality performance of the product. The present invention can be used for the product category of any kinds of baby monitor in forms of any system with transmitting video or audio signal from transmitter unit(s) over a wireless network to remote receiver unit(s), e.g., using a transmitter to transmit the video or audio signal to a receiver via 2.4 GHz wireless network. The present invention can be used for the product category of any kinds of baby monitor in forms of user interface to let users to activate the noise cancellation/reduction/improvement/enhancement feature of the product, e.g., using the mechanical button or user interface menu on monitor display etc. The present invention can be used for the product category of any kinds of baby monitor with the use of any design via software or hardware approach (e.g., RC filter circuitry, DSP processor etc.) to realize noise cancellation/reduction/improvement/enhancement feature to improve the audio quality performance of the product. The present invention can be used for the product category of any kinds of baby monitor with the use of any circuitry design (e.g., RC filter circuit) in different circuit component values, no matter the change of any component values in the related circuitry, to cancel/reduce/attenuate the noise signals to improve the audio quality performance of the product. The present invention can be used for the product category of any kinds of baby monitor with the use of any kinds of DSP in the design to achieve the purpose of noise cancellation/reduction/improvement/enhancement feature to improve the audio quality performance of the product.

What is claimed is:

1. A baby monitor system with noise filtering comprises a capture device and a display device, the capture device comprises a detection module, the display device comprises a passive resistor-capacitor (RC) filter;
    the detection module detects target signals from baby and environmental noise signals and transmits to the display device;
    the display device passes the target signals and noise signals to the RC filter;
    the RC filter has an active high pass filter to filter the noise signals according to default low frequencies for attenuating noise sound and to pass the target signals with signal amplification for improving target sound.

2. The baby monitor system of claim 1, wherein the RC filter adopts N-order active high pass filter formed by cascading at least one first-order active high pass filter and/or at least one second-order active high pass filter.

3. The baby monitor system of claim 1, wherein voltage gain for the active high pass filter is calculated as the formula:

$$Av(\text{dB}) = 20\log_{10}\left(\frac{Vout}{Vin}\right)$$

where:
$V_{out}$=the output voltage of the circuit; and
$V_{in}$=the input voltage of the circuit.

4. The baby monitor system of claim 3, wherein operation of the active high pass filter is verified from frequency gain as:
    at very low frequencies, $$f < fc \quad \frac{Vout}{Vin} < A_F$$

at the cut-off frequency, $$f = fc \quad \frac{Vout}{Vin} = \frac{A_F}{\sqrt{2}} = 0.707 A_F$$

at very high frequencies, $$f > fc \quad \frac{Vout}{Vin} \cong A_F$$

where:

$A_F$=the Pass band Gain of the filter;
f=the Frequency of the Input Signals in Hertz, (Hz); and
fc=the Cut-off Frequency in Hertz, (Hz).

5. The baby monitor system of claim 4, wherein magnitude of voltage gain is calculated as the formula:

$$A_F = 1 + \frac{R_2}{R_1}$$

wherein pass band gain is calculated as the formula:

$$\text{Voltage Gain, } (Av) = \frac{Vout}{Vin} = \frac{A_F\left(\frac{f}{fc}\right)}{\sqrt{1+\left(\frac{f}{fc}\right)^2}}$$

where:
R2 is the feedback resistor;
R1 is the corresponding input resistor.

* * * * *